(12) United States Patent
Yang et al.

(10) Patent No.: US 11,913,542 B2
(45) Date of Patent: Feb. 27, 2024

(54) VEHICLE HYDRAULIC CONTROL SYSTEM AND METHOD

(71) Applicant: GUANGZHOU AUTOMOBILE GROUP CO., LTD., Guangdong (CN)

(72) Inventors: Yang Yang, Guangdong (CN); Jiahao Zhou, Guangdong (CN); Hanqing He, Guangdong (CN); Yiguo Lu, Guangdong (CN); Weiming Zhang, Guangdong (CN); Peng Liu, Guangdong (CN)

(73) Assignee: GUANGZHOU AUTOMOBILE GROUP CO., LTD., Guangdong (CN)

( * ) Notice: Subject to any disclaimer, the term of this patent is extended or adjusted under 35 U.S.C. 154(b) by 0 days.

(21) Appl. No.: 17/926,167

(22) PCT Filed: May 31, 2021

(86) PCT No.: PCT/CN2021/097307
§ 371 (c)(1),
(2) Date: Nov. 18, 2022

(87) PCT Pub. No.: WO2021/244479
PCT Pub. Date: Dec. 9, 2021

(65) Prior Publication Data
US 2023/0193992 A1      Jun. 22, 2023

(30) Foreign Application Priority Data
Jun. 2, 2020   (CN) .......................... 202010490549.9

(51) Int. Cl.
*F16H 61/02* (2006.01)
*F16H 61/00* (2006.01)

(52) U.S. Cl.
CPC ..... *F16H 61/0025* (2013.01); *F16H 61/0251* (2013.01)

(58) Field of Classification Search
CPC .................................................. F15H 61/0025
See application file for complete search history.

(56) References Cited

U.S. PATENT DOCUMENTS

| 5,792,019 A | 8/1998 | Park |
| 2006/0070475 A1 | 4/2006 | Kodama et al. |

FOREIGN PATENT DOCUMENTS

| CN | 102310761 A | 1/2012 |
| CN | 105229346 A | 1/2016 |

(Continued)

OTHER PUBLICATIONS

Translation of CN110319181 (Machine).*

(Continued)

*Primary Examiner* — Michael Leslie
*Assistant Examiner* — Daniel S Collins
(74) *Attorney, Agent, or Firm* — Hodgson Russ LLP

(57) ABSTRACT

A vehicle hydraulic control system comprises a high-low pressure decoupling valve, a high-pressure control oil circuit including a main pressure regulating pilot solenoid valve connected to a transmission controller and used for regulating the main oil pressure according to the instructions of the transmission controller and a main pressure regulating mechanical valve, a low-pressure cooling and lubricating oil circuit, a mechanical pump communication with the high-pressure control oil circuit, and an electronic pump is in communication with the high-pressure control oil circuit or the low-pressure cooling and lubricating oil circuit by means of the high-low pressure decoupling valve. The main pressure regulating mechanical valve is used for guiding the flow output by the electronic pump and/or the mechanical pump in communication with the high-pressure control oil circuit (Continued)

to the low-pressure cooling and lubricating oil circuit according to the control of the main pressure regulating pilot solenoid valve.

17 Claims, 4 Drawing Sheets

(56) References Cited

FOREIGN PATENT DOCUMENTS

| | | | |
|---|---|---|---|
| CN | 106956586 A | | 7/2017 |
| CN | 208153452 U | | 11/2018 |
| CN | 209856328 U | * | 11/2018 |
| CN | 109282028 A | | 1/2019 |
| CN | 209212951 U | | 8/2019 |
| CN | 110285210 A | | 9/2019 |
| CN | 110319181 A | * | 10/2019 |
| CN | 110319181 A | | 10/2019 |
| CN | 209856328 U | | 12/2019 |
| DE | 102012214831 A1 | | 5/2014 |

OTHER PUBLICATIONS

Translation of CN-209856328 (Machine).*
WIPO, International Search Report dated Aug. 18, 2021.
China Patent Office, first Office action dated Mar. 22, 2022.
China Patent Office, second Office action dated Sep. 16, 2022.
China Patent Office, third Office action dated Feb. 2, 2023.

* cited by examiner

VEHICLE HYDRAULIC CONTROL SYSTEM AND METHOD

CROSS-REFERENCE TO RELATED APPLICATIONS

This application is a 371 of International Application No. PCT/CN2021/097307, filed May 31, 2021, which is based upon and claims the priority of the Chinese patent application No. 202010490549.9, filed Jun. 2, 2020, the entire contents of which are referred and incorporated herein.

TECHNICAL FIELD

The present application relates to the field of hybrid electric vehicle control technologies, and more particularly, to a vehicle hydraulic control system and a method.

BACKGROUND

At present, the vehicle power of a hybrid electric vehicle is mainly provided by an engine and a motor. Good power property and efficiency of the vehicles not only depend on the engine and the motor itself, but also need to be guaranteed by an excellent power matching relationship. For hybrid electric vehicles, the automatic transmission needs to switch between different working modes through an engagement of clutches or brakes, so that stability and quick response of clutch engagement control directly affect a shifting quality of the whole machine.

The engagement of the clutch in the vehicle automatic transmission is generally controlled by a vehicle hydraulic control system, which has a function of combining high torque and providing buffer damping and cooling and lubrication for the engagement of the clutch. Since there are many working modes of the hybrid electric vehicle (e.g., pure electric working mode or hybrid working mode), there are higher control requirements for the clutch to switch among different working modes. In addition, due to an existence of the drive motor and engine, the requirement for flow to cool and lubricate the motor are also large, so a reasonable design of the hydraulic control system is particularly important.

SUMMARY

There are provided a vehicle hydraulic control system and a method according to embodiments of the present disclosure. The technical solution is as below:.

According to a first aspect of embodiments of the present disclosure, there is provided a vehicle hydraulic control system, connected to a transmission controller, comprising:
a high-pressure control oil circuit comprising:
a main pressure regulating pilot solenoid valve connected to the transmission controller, and configured to adjust a main oil pressure according to an instruction of the transmission controller; and
a main pressure regulating mechanical valve;
a low-pressure cooling and lubricating oil circuit;
a mechanical pump communicated with the high-pressure control oil circuit;
a high-low pressure decoupling valve; and
an electronic pump communicated with the high-pressure control oil circuit or the low-pressure cooling and lubricating oil circuit through the high-low pressure decoupling valve;

wherein the main pressure regulating mechanical valve is configured to guide a flow output by the electronic pump and/or the mechanical pump communicated with the high-pressure control oil circuit to the low-pressure cooling and lubricating oil circuit according to a control of the main pressure regulating pilot solenoid valve, wherein when the high-low pressure decoupling valve is in a coupled state, the electronic pump is communicated with the high-pressure control oil circuit, to supply oil to the high-pressure control oil circuit and the low-pressure cooling and lubricating oil circuit, and wherein when the high-low pressure decoupling valve is in a decoupled state, the electronic pump is communicated with the low-pressure cooling and lubricating oil circuit, to supply oil to the low-pressure cooling and lubricating oil circuit.

According to a second aspect of embodiments of the present disclosure, there is provided a vehicle hydraulic control method, performed by a transmission controller, comprising:
executing a hydraulic control strategy corresponding to a target working mode in a target working mode, to control a vehicle hydraulic control system to work;
collecting hydraulic state data of the vehicle hydraulic control system; and
dynamically adjusting a working state of the vehicle hydraulic control system according to the hydraulic state data and a preset adjustment strategy.

BRIEF DESCRIPTION OF THE DRAWINGS

In order to illustrate technical solutions of embodiments of the present application more clearly, the drawings that are used in the description of the embodiments of the present application will be introduced briefly as follows. Obviously, the drawings in the following description are only some embodiments of the present application, for those of ordinary skill in the art, other drawings may also be obtained from these drawings without creative labor.

Figure 1:
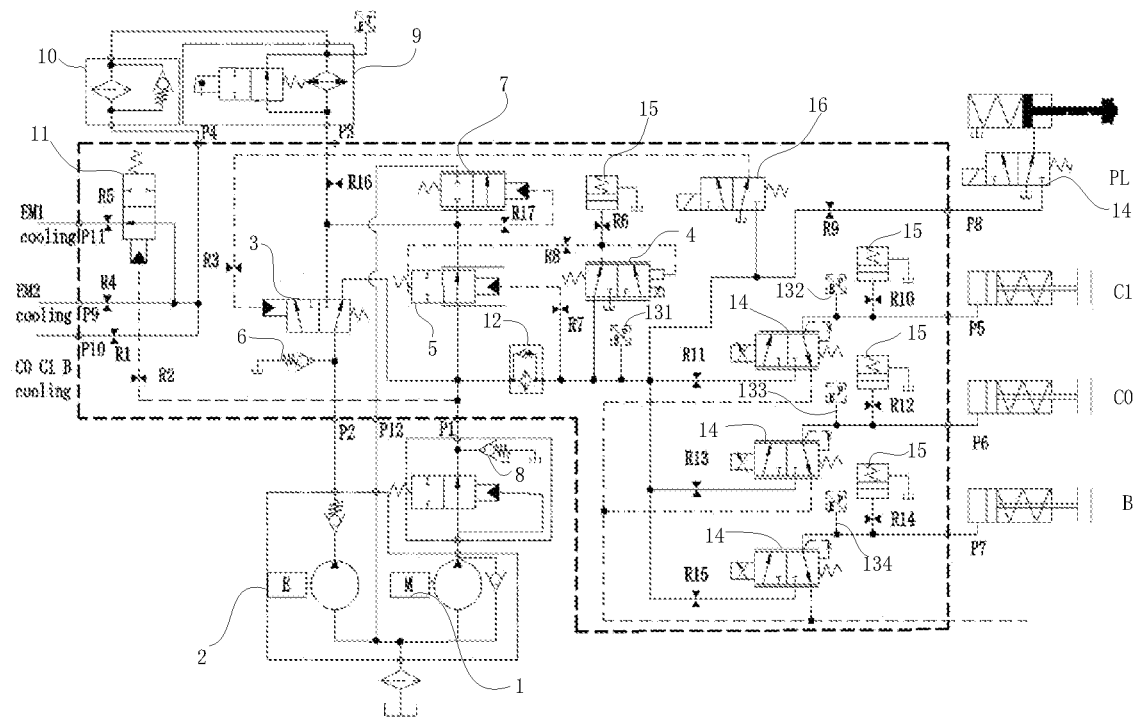
FIG. 1 illustrates a diagram of a vehicle hydraulic control system according to an embodiment of the present application.

1, mechanical pump; 2, electronic pump; 3, high-low pressure decoupling valve; 4, main pressure regulating pilot solenoid valve; 5, main pressure regulating mechanical valve; 6, pressure limiting valve; 7, relief valve; 8, oil pump check valve; 9, hydraulic oil cooler; 10, external pressure filter; 11, cooling and lubricating reversing valve; 12, main pressure filter; 131, main pressure sensor; 132, first pressure sensor; 133, second pressure sensor; 134, third pressure sensor; 14, direct-drive solenoid valve; 15, accumulator; and 16, pilot switch solenoid valve.

DETAILED DESCRIPTION

In order to make the technical problems solved by the present application, technical solutions and beneficial effects clearer, the present application will be described in detail with the following drawings and embodiments. It should be understood that the specific embodiments described herein are only used to explain the present application, but not to limit the present application.

In the description of this application, it should be understood that orientations or positional relationships indicated by the terms such as "longitudinal", "radial", "length", "width", "thickness", "up", "down", "front", "rear", "left", "right", "vertical", "horizontal", "top", "bottom", "inside" and "outside" are based on orientations or positional relationships shown in the accompanying drawings, which are only for the convenience of describing the present application and simplifying the description, rather than indicating or implying that the referred devices or elements must have a particular orientation, be constructed and operate in a particular orientation, and therefore should not be construed as a limitation of the present application. In the description of this application, unless stated otherwise, "plurality" means two or more.

In the description of the present application, it should be noted that, unless otherwise expressly specified and limited, the terms "arrange", "connect" and "joint" should be understood in a broad sense, for example, they may be a fixed connection or a detachable connection, or an integral connection. They may be a mechanical connection, or an electrical connection. They may be a direct connection, an indirect connection through an intermediate medium, or an internal communication between two elements. For those of ordinary skill in the art, specific meanings of the abovementioned terms in the present application may be understood in specific situations.

The present application provides a vehicle hydraulic control system, as shown in FIGS. 1-4, connected to a transmission controller, including a mechanical pump 1, an electronic pump 2, a high-low pressure decoupling valve 3, a high-pressure control oil circuit and a low-pressure cooling and lubricating oil circuit. The mechanical pump 1 is connected to the high-pressure control oil circuit, and the electronic pump 2 is connected to the high-pressure control oil circuit or the low-pressure cooling and lubricating oil circuit through the high-low pressure decoupling valve 3. The high-pressure control oil circuit includes a main pressure regulating pilot solenoid valve 4 and a main pressure regulating mechanical valve 5. The main pressure regulating pilot solenoid valve 4 is connected to the transmission controller, and is configured to adjust a main oil pressure according to an instruction of the transmission controller. The main pressure regulating mechanical valve 5 is configured to guide a flow output by the electronic pump 2 and/or the mechanical pump 1 connected to the high-pressure control oil circuit to the low-pressure cooling and lubricating oil circuit according to a control of the main pressure regulating pilot solenoid valve 4

When the high-low pressure decoupling valve 3 is in a coupled state, the electronic pump 2 is communicated with the high-pressure control oil circuit, to supply oil to the high-pressure control oil circuit and the low-pressure cooling and lubricating oil circuit.

When the high-low pressure decoupling valve 3 is in the decoupled state, the electronic pump 2 is communicated with the low-pressure cooling and lubricating oil circuit, to supply oil to the low-pressure cooling and lubricating oil circuit.

The transmission controller is connected to the vehicle control system, and is configured to control the vehicle hydraulic control system to work according to the working mode indicated by the vehicle control system. The main oil pressure specifically refers to oil pressure of the main oil circuit in the figure, that is, the pressure of the oil circuit where the main pressure sensor 131 is located in the figure. The low-pressure cooling and lubricating oil circuit mainly cools and lubricates an EM1 motor, an EM2 motor and clutch shaft teeth. The high-pressure control oil circuit mainly provides the required flow for the control of the actuator. The actuator includes a C0 clutch, a C1 clutch, a B clutch (i.e., brake) and a parking mechanism.

Specifically, in the vehicle hydraulic control system, an input shaft of a gearbox is connected to the mechanical pump 1 to provide the mechanical pump 1 with working power. An oil outlet of the mechanical pump 1 is communicated with the high-pressure control oil circuit. The mechanical pump 1 directly provides a flow for the high-pressure control oil circuit while the mechanical pump 1 and the EM1 motor work. The electronic pump 2 is communicated with the high-pressure control oil circuit or the low-pressure cooling and lubricating oil circuit through the high-low pressure decoupling valve 3. The high-pressure control oil circuit includes the main pressure regulating pilot solenoid valve 4 and the main pressure regulating mechanical valve 5. The main pressure regulating pilot solenoid valve 4 is connected to the transmission controller, and is configured to adjust coil current according to the instruction of the transmission controller, and further adjust the main oil pressure, thereby achieving a pilot control of the main oil pressure.

Figure 3:
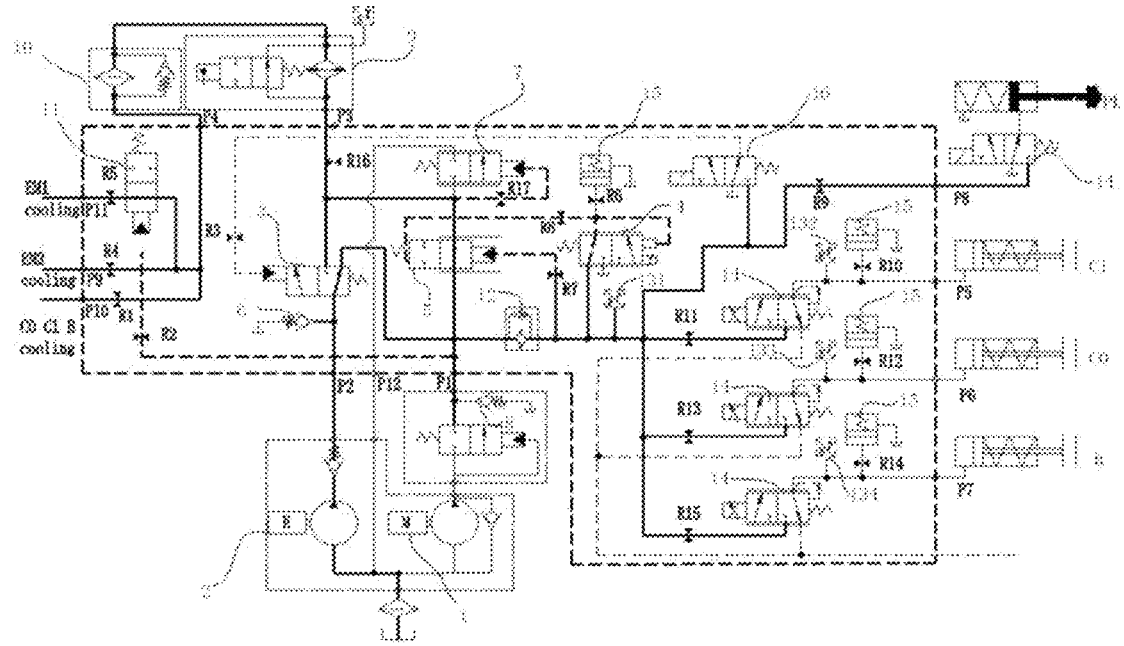
FIG. 3 illustrates a diagram of the vehicle hydraulic control system according to an embodiment of the present application.

Specifically, as shown in FIG. 3, both the mechanical pump and the EM1 motor enter the working state in this circumstance, the oil outlet of the mechanical pump 1 is communicated with one end of the main pressure regulating mechanical valve 5, and the other end of the main pressure regulating mechanical valve 5 is communicated with the low-pressure pilot oil circuit 21. The main pressure regulating mechanical valve 5 adjusts opening degree of the valve core with the a current change of the main pressure regulating pilot solenoid valve 4 (i.e., a change of the main oil pressure), and then guides the flow output by the electronic pump 2 and/or the mechanical pump 1 connected to the high-pressure control oil circuit to the low-pressure cooling and lubricating oil circuit through the low-pressure pilot oil circuit 21, so as to meet the flow of the high-pressure control oil circuit and supply the flow for the low-pressure cooling and lubricating oil circuit while the mechanical pump 1 is working, thereby effectively reducing the load of the electronic pump 2, and improving the use efficiency and service life of the electronic pump 2.

Figure 2:
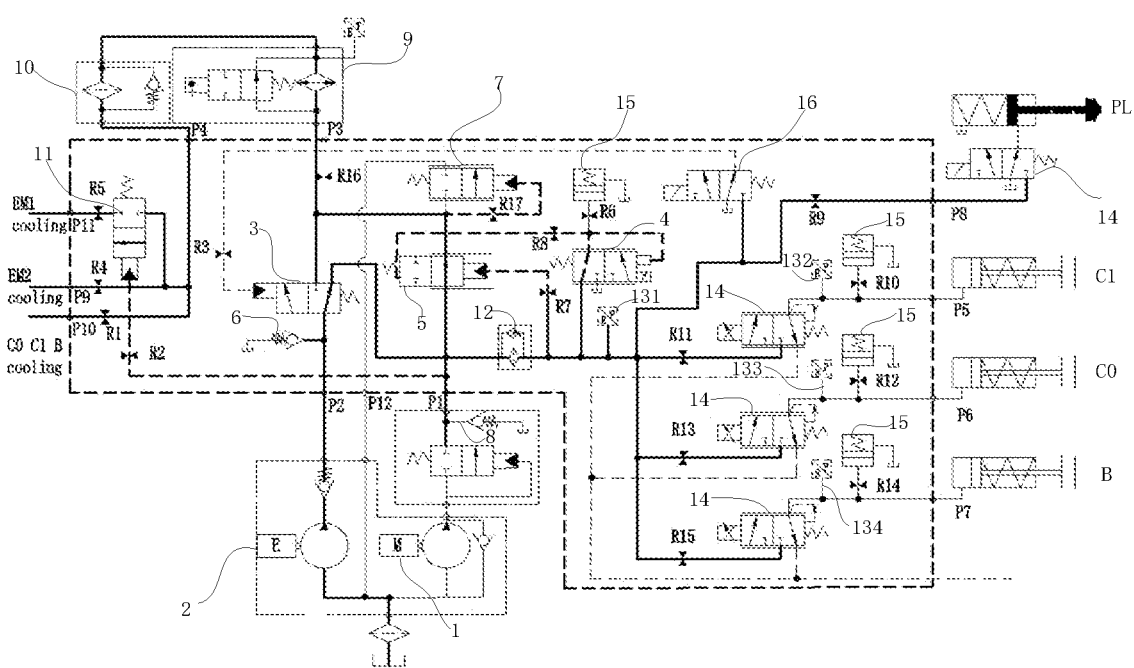
FIG. 2 illustrates a diagram of the vehicle hydraulic control system according to an embodiment of the present application.

In some embodiments, as shown in FIG. 2, in this circumstance, the mechanical pump and the EM1 motor do not enter the working state. When the mechanical pump 1 does not work, the electronic pump 2 may be communicated with the high-pressure control oil circuit through the high-low pressure decoupling valve 3, and provides a flow for the low-pressure cooling and lubricating oil circuit through the low-pressure pilot oil circuit 21, so as to meet flow requirements in various working modes, ensure hydraulic requirements of the vehicle hydraulic control system and improve the stability of the vehicle hydraulic control system, thereby effectively improving the stability of the clutch control and the shifting quality.

It should be noted that a normal working state of the high-low pressure decoupling valve 3 is the coupled state, that is, the high-low pressure decoupling valve 3 as shown in FIG. 1 is in a right working state. When different working modes are switched, the high-low pressure decoupling valve 3 switches among different working states according to different needs.

It can be understood that when the high-low pressure decoupling valve 3 is in the coupled state, that is, the high-low pressure decoupling valve 3 in FIG. 3 is in the right working state, the electronic pump 2 is communicated with the high-pressure control oil circuit. In this circumstance, the mechanical pump 1, the EM1 motor and EM2 motor work, and the electronic pump 2 is coupled with the mechanical pump 1 to work. The dual pumps supply oil to the high-pressure control oil circuit and the low-pressure cooling and lubricating oil circuit to quickly respond to the hydraulic requirements in different working modes. Therefore, the stability of the vehicle hydraulic control system is improved, thereby effectively improving the stability of the clutch control and the shifting quality. If the mechanical pump 1 does not work, the electronic pump 2 alone supplies oil for the high-pressure control oil circuit and the low-pressure cooling and lubricating oil circuit, thereby ensuring the hydraulic requirements of the vehicle hydraulic control system.

Figure 4:
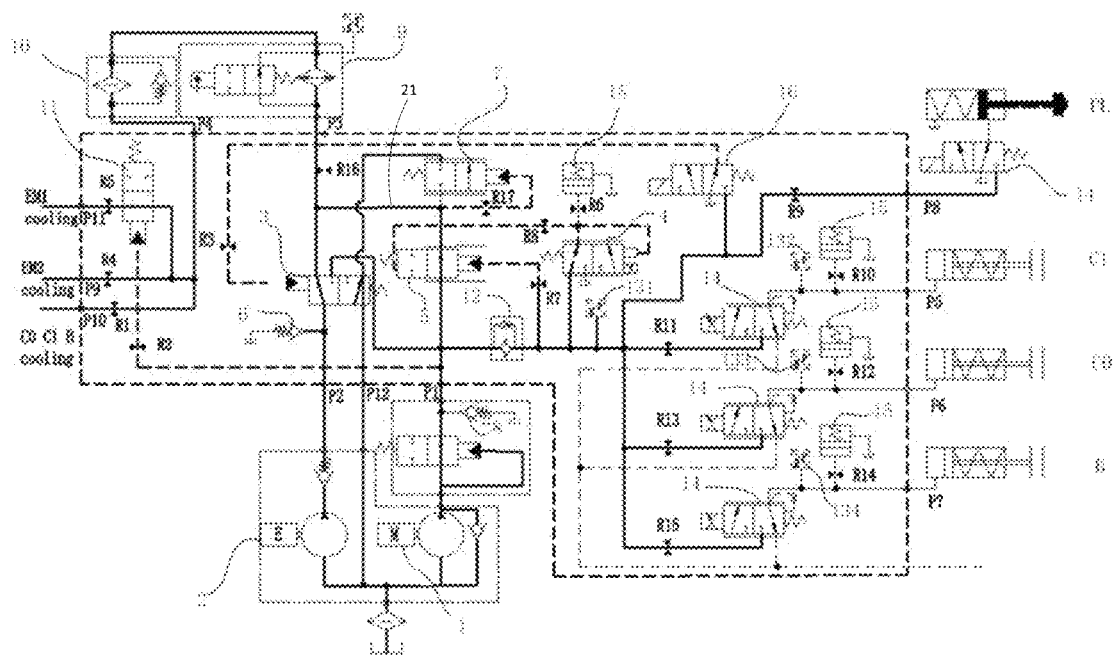
FIG. 4 illustrates a diagram of the vehicle hydraulic control system according to an embodiment of the present application.

When the high-low pressure decoupling valve 3 is in the decoupled state, that is, the high-low pressure decoupling valve 3 in FIG. 4 is in a left working state, the electronic pump 2 is communicated with the low-pressure cooling and lubricating oil circuit, and directly supplies oil for the low-pressure cooling and lubricating oil circuit, thereby effectively reducing the load of the electronic pump 2 and improving the service life of the electronic pump 2.

In some embodiments, the electronic pump 2 is communicated with the high-low pressure decoupling valve 3, and a pressure limiting valve 6 is provided on a pipeline communicating the electronic pump 2 with the high-low pressure decoupling valve 3. The pressure limiting valve 6 is configured to adjust a pressure of flow output by the electronic pump 2, thereby ensuring the stability of the pressure of the output flow.

In some embodiments, as shown in FIG. 4, the system further includes a relief valve 7 communicated with the oil inlet of the mechanical pump 1 and the low-pressure pilot oil circuit 21. The relief valve 7 may be opened when the flow output of the mechanical pump 1 is relatively large and the load of the low-pressure cooling and lubricating oil circuit is constant, so that the redundant flow flows into the oil inlet of the mechanical pump 1 through the relief valve 7, thereby ensure the stability of the system oil pressure.

Further, the system further includes an oil pump check valve 8, which is arranged on the pipeline communicating the oil outlet of the mechanical pump 1 with the main pressure regulating mechanical valve 5 to prevent a backflow.

In some embodiments, the low-pressure cooling and lubricating oil circuit includes a hydraulic oil cooler 9, an external pressure filter 10 connected to the hydraulic oil cooler 9, and a cooling and lubricating reversing valve 11 connected to the external pressure filter 10.

The hydraulic oil cooler 9 is configured to cool oil flowing into the low-pressure cooling and lubricating oil circuit. Specifically, the low-pressure cooling and lubricating oil circuit is directly communicated with the EM2 motor and the clutch shaft teeth, so as to cool and lubricate the EM2 motor and the clutch shaft teeth. The EM1 motor is communicated with the low-pressure cooling and lubricating oil circuit by controlling the cooling and lubricating reversing valve 11. In this embodiment, the EM1 motor specifically refers to an engine, and the EM2 motor specifically refers to a drive motor.

It can be understood that since the flow flowing into the external pressure filter 10 includes a flow from the low-pressure pilot oil circuit 21 and a flow output by the high-low pressure decoupling valve 3 in the decoupled state. Therefore, the external pressure filter 10 can filter the flow of the entire system and protect the hydraulic components of the entire system.

In some embodiments, the vehicle hydraulic control system includes at least one orifice (R1-R17 as shown in FIG. 1), so as to realize a reasonable distribution of the flow of each oil circuit through the orifices of different diameters.

The vehicle hydraulic control system in this embodiment connected to a transmission controller and comprises a mechanical pump 1, an electronic pump 2, a high-low pressure decoupling valve 3, a high-pressure control oil circuit and a low-pressure cooling and lubricating oil circuit. The mechanical pump 1 is communicated with the high-pressure control oil circuit, and the electronic pump 2 is communicated with the high-pressure control oil circuit or the low-pressure cooling and lubricating oil circuit through the high-low pressure decoupling valve 3. The high-pressure control oil circuit includes a main pressure regulating pilot solenoid valve 4 and a main pressure regulating mechanical valve 5. The main pressure regulating pilot solenoid valve 4 is connected to the transmission controller, and is configured to adjust a main oil pressure according to an instruction of the transmission controller, so as to meet requirements for oil pressures under different working modes. The main pressure regulating mechanical valve 5 is configured to guide a flow output by the electronic pump 2 and/or the mechanical pump 1 communicated with the high-pressure control oil circuit to the low-pressure cooling and lubricating oil circuit by adjusting an opening degree of the valve core according to a control of the main pressure regulating pilot solenoid valve 4. Therefore, the flow of the high-pressure control oil circuit can also supply the low-pressure cooling and lubricating oil circuit, thereby reducing a load of the electronic pump 2 and improving the use efficiency and service life of the electronic pump 2. Besides, by switching the working state of the high-low pressure decoupling valve 3, the electronic pump 2 is communicated with the high-pressure control oil circuit or the low-pressure cooling and lubricating oil circuit to meet the flow requirements in various working modes, so as to meet the hydraulic requirements of the vehicle hydraulic control system, and improve the stability of the vehicle hydraulic control system, thereby effectively improving the stability of the clutch control and shifting quality.

In one embodiment, as shown in FIGS. 1-4, the high-pressure control oil circuit includes a main oil circuit and at least one branch oil circuit communicating with the main oil circuit. The branch oil circuit is connected to the actuator. The main oil circuit is provided with a main pressure filter 12, which is configured to filter the flow flowing into the branch oil circuit.

The main pressure filter 12 refers to a pressure filter with high filtration efficiency provided on the high-pressure control oil circuit.

Specifically, by providing the main pressure filter 12 on the main oil circuit, the flow flowing into the branch oil circuit may be filtered, thereby reducing a seizure probability of the hydraulic components on the branch oil circuit, improving the service life of the hydraulic components, and ensuring reliability and stability of the work of the hydraulic components.

In this embodiment, in the vehicle hydraulic control system, under a simultaneous action of the main pressure filter 12 and the external pressure filter 10, the seizure probability of the hydraulic components can be greatly reduced, the service life of the hydraulic components is increased, and the reliability of the hydraulic components is ensured. In addition, the power loss of the system may also be effectively reduced through the arrangement of the main pressure filter 12 and the external pressure filter 10.

In some embodiments, the vehicle hydraulic control system is further provided with a sensor assembly configured to collect system hydraulic state data. The sensor assembly includes but is not limited to a temperature sensor, a rotational speed sensor and a pressure sensor. The hydraulic state data collected by the sensor assembly are fed back to the transmission controller, so that the transmission controller can adjust the working state of the system according to the hydraulic state data, thereby ensuring the stability of the system.

The temperature sensor is arranged on the low-pressure cooling and lubricating oil circuit, which is configured to collect oil temperature data of the low-pressure cooling and lubricating oil circuit. The rotational speed sensor may be arranged on the input shaft of the gearbox connected to the mechanical pump 1, which is configured to collect the rotational speed data of the mechanical pump 1. The pressure sensor is configured to collect the pressure data of the main oil circuit and the branch oil circuit, which includes a main pressure sensor 131 arranged on the main oil circuit, a first pressure sensor 132, a second pressure sensor 133 and a third pressure sensor 134 arranged on the branch oil circuit.

In one embodiment, as shown in FIGS. 3-4, the branch oil circuit is provided with a direct-drive solenoid valve 14 and an accumulator 15. The direct-drive solenoid valve 14 is configured to engage the branch oil circuit with the actuator, and the accumulator 15 is configured to maintain the stability of the oil pressure of the branch oil circuit.

In this embodiment, the branch oil circuit is further provided with the direct-drive solenoid valve 14 and the accumulator 15. The direct-drive solenoid valve 14 can directly engage with the actuator required by the working mode when the engagement pressure required by the actuator is satisfied according to the control of the main pressure regulating pilot solenoid valve 4, so as to complete an engagement action of the actuator. In addition, by providing the accumulator 15 on the branch oil circuit, the pressure fluctuation of the branch oil circuit can be effectively alleviated, thereby reducing a shifting impact and ensuring the stability of shifting.

In one embodiment, as shown in FIGS. 1-4, the high-pressure control oil circuit further includes a pilot switch solenoid valve 16. The pilot switch solenoid valve 16 is connected to the transmission controller and the high-low pressure decoupling valve 3, which is configured to control the working state of the high-low pressure decoupling valve 3 according to the instruction of the transmission controller.

Specifically, the high-pressure control oil circuit further includes a pilot switch solenoid valve 16 configured to control the working state of the high-low pressure decoupling valve 3. The pilot switch solenoid valve 16 can control the working state of the high-low pressure decoupling valve 3 according to the instruction of the transmission controller.

It can be understood that the working state of the high-low pressure decoupling valve 3 in this embodiment is the coupled state, that is, the high-low pressure decoupling valve 3 in FIGS. 1-3 is in the right working state. When the pilot switch solenoid valve 16 is energized, the pilot switch solenoid valve 16 controls the high-low pressure decoupling valve 3 to be in the decoupled state, that is, the high-low pressure decoupling valve 3 in FIG. 4 is in the left working state. When the pilot switch solenoid valve 16 is de-energized, the pilot switch solenoid valve 16 controls the high-low pressure decoupling valve 3 to be in the coupled state, and the pilot switch solenoid valve 16 can switch the working state of the high-low pressure decoupling valve 3 in real time according to the instruction of the transmission controller, so as to meet the hydraulic requirements of different working modes, thereby effectively improving the stability of the hydraulic system, and reducing the flow leakage of the hydraulic system.

In some embodiments, the vehicle hydraulic control system in this embodiment has a failure protection mechanism, which can make the system in a controllable state even if any oil pump fails. It can be understood that when the electronic pump 2 fails, the mechanical pump 1 is driven by the motor or the engine to maintain the oil pressure of the main oil circuit, and provides flow to the low-pressure cooling and lubricating oil circuit through the main pressure regulating mechanical valve 5. When the mechanical pump 1 fails, the high-low pressure decoupling valve 3 can be controlled to be in a coupled state, and the electronic pump 2 is communicated with the high-pressure control oil circuit. In this circumstance, the electronic pump 2 is in the working state shown in FIGS. 1-3, and the electronic pump 2 provides a flow for the high-pressure control oil circuit and the low-pressure cooling and lubricating oil circuit, so that a basic performance of the hydraulic system can also be met when the main oil pressure is increased.

In some embodiments, when the pilot switch solenoid valve 16 fails, since the working normal state of the high-low pressure decoupling valve 3 in this embodiment is the coupled state, the basic performance of the system can still be maintained, thereby ensuring the reliability of the system and meeting the security requirements of the whole machine.

Figure 5:
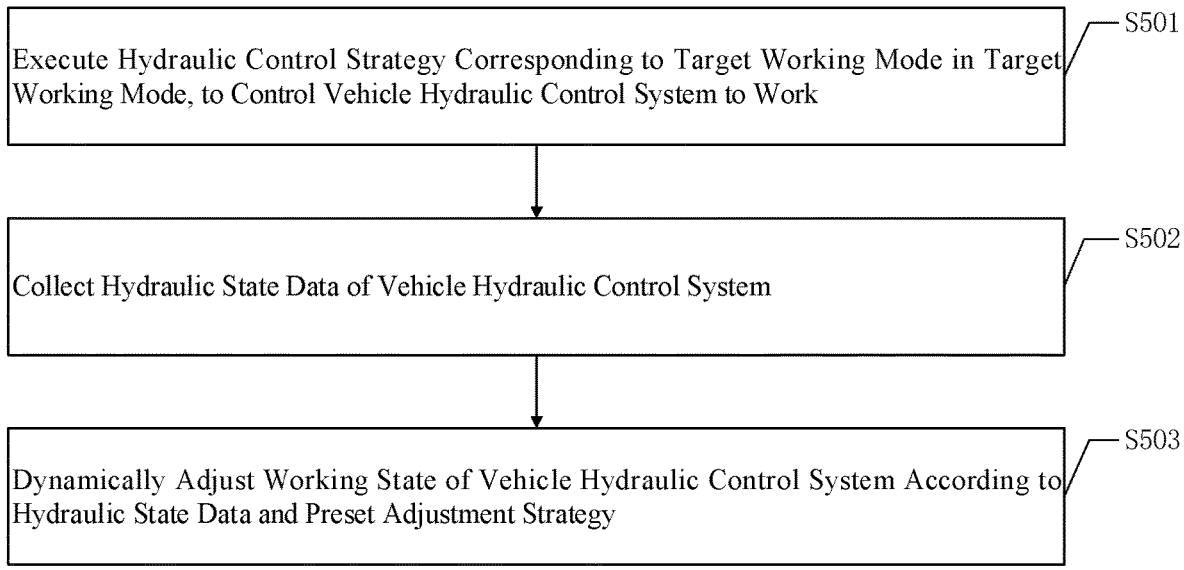
FIG. 5 is a flowchart of a vehicle hydraulic control method according to an embodiment of the present application.

The present application provides a vehicle hydraulic control method, as shown in FIG. 5, including the following steps executed by a transmission controller.

S501: a hydraulic control strategy corresponding to a target working mode is executed in a target working mode, to control a vehicle hydraulic control system to work.

The hydraulic control strategy is a preset control strategy set based on different working modes and configured to control the vehicle hydraulic control system to work. The target working mode includes a pure electric working mode and a hybrid working mode. The pure electric working mode refers to a working mode in which the mechanical pump and the EM1 motor do not work, and the electronic pump and the EM2 motor work. The hybrid working mode refers to a working mode in which the electronic pump, mechanical pump, EM1 motor and EM2 motor all work. By executing the hydraulic control strategy corresponding to the target working mode to meet hydraulic requirements of different modes. The stability of the vehicle hydraulic control system is improved by ensuring to meet the hydraulic requirements of the vehicle hydraulic control system, thereby effectively improving the stability of clutch control and the shifting quality.

S502: hydraulic state data of the vehicle hydraulic control system are collected.

Specifically, the hydraulic state data in the vehicle hydraulic control system is collected by arranging a sensor assembly in the vehicle hydraulic control system. The hydraulic state data includes, but is not limited to, pressure data of the high-pressure control oil circuit, oil temperature data of the low-pressure cooling and lubricating oil circuit and rotational speed data of the mechanical pump. As an example, the temperature sensor is arranged on the low-pressure cooling and lubricating oil circuit to collect the oil temperature data of the low-pressure cooling and lubricating oil circuit. The rotational speed sensor may be arranged on an input shaft of the gearbox connected to the mechanical pump, and is configured to collect the rotational speed data of the mechanical pump. The pressure sensor is configured to collect the pressure data of the main oil circuit and the branch oil circuit, which includes a main pressure sensor arranged on the a main oil circuit, a first pressure sensor, a second pressure sensor and a third pressure sensor arranged on the branch oil circuit.

S503: the working state of the vehicle hydraulic control system is dynamically adjusted according to the hydraulic state data and a preset adjustment strategy.

The preset adjustment strategy is a preset adjustment strategy configured to perform a real-time analysis according to the hydraulic data in different working modes and dynamically adjust the working state of the vehicle hydraulic control system. Specifically, the real-time analysis is performed according to the hydraulic state data, so as to determine whether the hydraulic state data meets the requirements. If not, the working state of the vehicle hydraulic control system is dynamically adjusted according to the preset adjustment strategy, so as to ensure the stability of the hydraulic pressure in the system, thereby reducing the leakage of the hydraulic system.

In this embodiment, by executing the hydraulic control strategy corresponding to the target working mode in the target working mode, the vehicle hydraulic control system is controlled to work, so as to meet the hydraulic requirements of working modes. Then, by collecting the hydraulic state data of the vehicle hydraulic control system, the working state of the vehicle hydraulic control system can be dynamically adjusted in real time according to the hydraulic state data in real time and the preset adjustment strategy, so as to effectively ensure the stability of the system, thereby ensuring the stability of the clutch control and improving the shifting quality.

Figure 6:
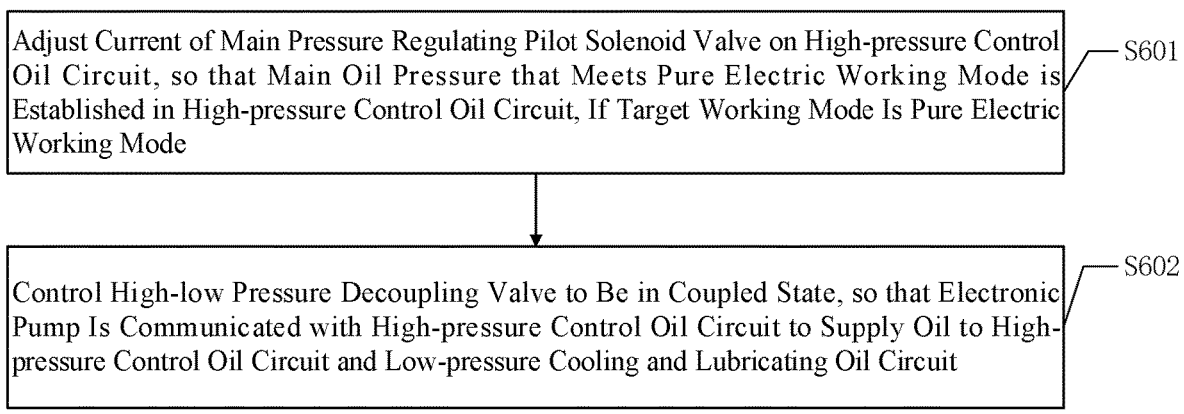
FIG. 6 is a specific flowchart of step S501 in FIG. 5.

In one embodiment, as shown in FIG. 6, in step S501, that is, step of executing the hydraulic control strategy corresponding to the target working mode in the target working mode to control the vehicle hydraulic control system to work specifically includes the following steps.

S601: if the target working mode is the pure electric working mode, a current of the main pressure regulating pilot solenoid valve on the high-pressure control oil circuit is adjusted, so as to establish a main oil pressure that is needed in the pure electric working mode on the high-pressure control oil circuit.

Specifically, if the target working mode is the pure electric working mode, it is required to adjust the current of the main pressure regulating pilot solenoid valve on the high-pressure control oil circuit, so as to establish the main oil pressure that is needed the pure electric working mode on the high-pressure control oil circuit, thereby meeting the hydraulic requirements of the parking mechanism.

It can be understood that, there is no gear shifting requirement in the pure electric working mode. In this circumstance, the main oil pressure needs to be adjusted firstly to meet the oil pressure requirements of the parking mechanism for subsequent work.

S602: the high-low pressure decoupling valve is controlled to be in a coupled state, so that the electronic pump is communicated with the high-pressure control oil circuit, to supply oil to the high-pressure control oil circuit and the low-pressure cooling and lubricating oil circuit.

Specifically, in the pure electric working mode, since the mechanical pump is not working in this circumstance, the pilot switch solenoid valve is in a de-energized state, and the high-low pressure decoupling valve is in the coupled state (i.e., a right position working state), so that the electronic pump is communicated with the high-voltage control oil circuit. The flow output by the electronic pump enters the high-pressure control oil circuit through the high-low pressure decoupling valve, and the flow entering the high-pressure control oil circuit is filtered by a main pressure filter, which can effectively improve a cleanliness level of the oil entering each direct-drive solenoid valve at the rear end, and avoid the seizure of the valve core.

After a required oil pressure is established on the high-pressure control oil circuit, the flow enters the low-pressure cooling and lubricating oil circuit through the main pressure regulating mechanical valve, so that the electronic pump supplies oil for the low-pressure cooling and lubricating oil circuit. In this circumstance, the low-pressure cooling and lubricating oil circuit can cool and lubricate the EM2 motor and the clutch shaft teeth. As an example, the low-pressure cooling and lubricating oil circuit includes a hydraulic oil cooler and an external pressure filter connected to the hydraulic oil cooler.

It can be understood that the flow flowing into the low-pressure cooling and lubricating oil circuit is cooled and lubricated by the hydraulic oil cooler and output to the external pressure filter for filtering. Then the flow output by the external pressure filter passes through an orifice R1 and an orifice R4, so as to distribute different flows for the EM2 motor and the clutch shaft teeth for cooling and lubricating.

In this embodiment, in the pure electric working mode, by controlling the high-low pressure decoupling valve to be in the coupled state, the electronic pump is communicated with the high-pressure control oil circuit. The flow output by the electronic pump enters the high-pressure control oil circuit through the high-low pressure decoupling valve, and then enters the low-pressure cooling and lubricating oil circuit through the main pressure regulating mechanical valve, so that the electronic pump supplies oil for the low-pressure cooling and lubricating oil circuit, so as to cool and lubricate the EM2 motor and the clutch shaft teeth, thereby meeting the hydraulic requirements in the pure electric working mode.

Figure 7:
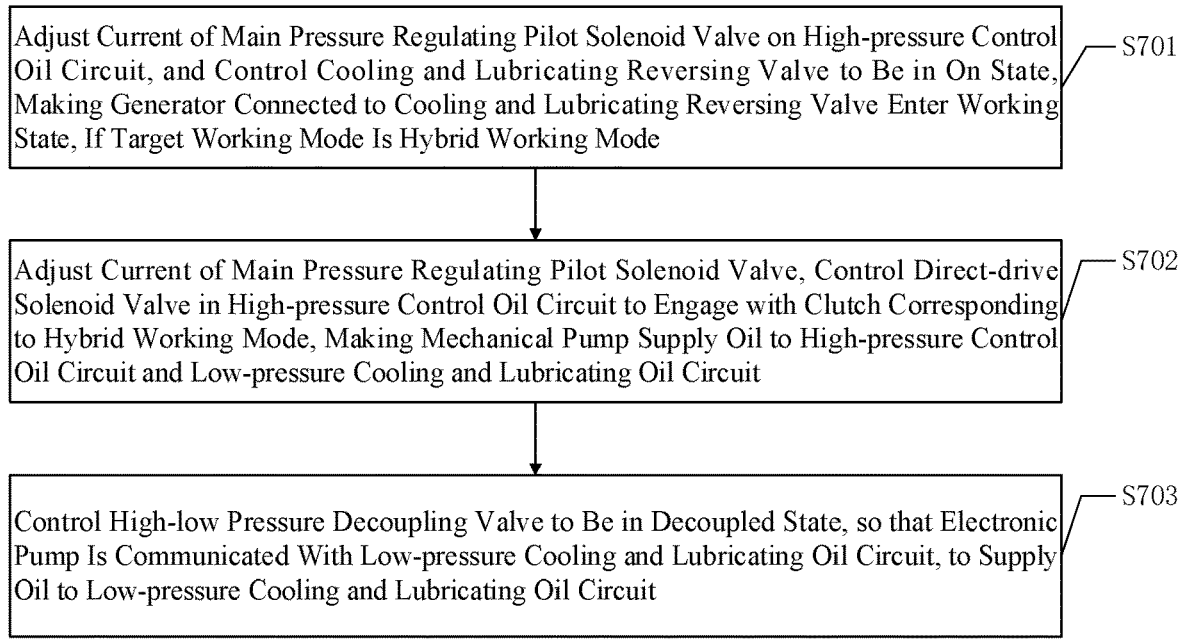
FIG. 7 is a specific flowchart of step S501 in FIG. 5.

In one embodiment, as shown in FIG. 7, in step S501, that is, step of executing the hydraulic control strategy corresponding to the target working mode in the target working mode to control the vehicle hydraulic control system to work specifically includes the following steps.

S701: if the target working mode is a hybrid working mode, the current of the main pressure regulating pilot solenoid valve on the high-pressure control oil circuit is adjusted, and the cooling and lubricating reversing valve is controlled to be in an on state, making a generator connected to the cooling and lubricating reversing valve enter a working state.

Specifically, if the target working mode is the hybrid working mode, that is, the vehicle working mode in this circumstance has entered the hybrid working mode from the pure electric working mode, it is required to adjust the current of the main pressure regulating pilot solenoid valve on the high-pressure control oil circuit firstly, so as to improve the main oil pressure. The cooling and lubricating reversing valve is in the on state under the action of the main oil pressure, so that the low-pressure cooling and lubricating oil circuit is communicated with the generator connected to the cooling and lubricating reversing valve, making the generator enter the working state. In this circumstance, the low-pressure cooling and lubricating oil circuit distributes different flows for the EM1 motor (i.e., the generator), the EM2 motor and the clutch shaft teeth for cooling and lubrication through the orifice R1, an orifice R4 and an orifice R5. As an example, the low-pressure cooling and lubricating oil circuit includes a hydraulic oil cooler, an external pressure filter connected to the hydraulic oil cooler, and the cooling and lubricating reversing valve connected to the external pressure filter.

It can be understood that, if in the pure electric working mode, the cooling and lubricating reversing valve is in a stop state. In this circumstance, the low-pressure cooling and lubricating oil circuit does not cool and lubricate the EM1 motor (i.e., the generator).

S702: the current of the main pressure regulating pilot solenoid valve is adjusted, and the direct-drive solenoid valve in the high-pressure control oil circuit is controlled to engage with the clutch corresponding to the hybrid working mode.

Specifically, when the engine starts to work, the mechanical pump also enters the working state. In this circumstance, if the corresponding clutch needs to be engaged (i.e., there is a gear shifting requirement), the current of the main pressure regulating pilot solenoid valve on the high-pressure control oil circuit needs to be adjusted again, making the main oil pressure meet an engagement requirement of the clutch that needs to be engaged. Therefore, the direct-drive solenoid valve in the high-pressure control oil circuit is controlled to engage with the current clutch that needs to be engaged (i.e., the clutch corresponding to the hybrid working mode), so as to provide power for the mechanical pump. Therefore, the flow output by the mechanical pump enters the high-pressure control oil circuit through the oil pump check valve, and supplies oil to the high-pressure control oil circuit, to maintain the pressure required by each clutch. Then, the flow enters the low-pressure cooling and lubricating oil circuit through the main pressure regulating mechanical valve, and supply flow to the low-pressure cooling and lubricating oil circuit, thereby ensuring the stability of the hydraulic system and meeting the gear shifting requirement.

It can be understood that, in this hybrid working mode, there may be situations in which multiple clutches need to work at the same time, and the oil pressure may drop due to insufficient instantaneous flow. In this circumstance, since the high-low pressure decoupling valve is in the coupled state, the electronic pump is communicated with the high-pressure control oil circuit, so as to supply flow to the high-pressure control oil circuit, thereby avoiding the problem of oil pressure drop. Supply measures may be taken in time to effectively ensure the stability of the system oil pressure.

S703: the high-low pressure decoupling valve is controlled to be in the decoupled state, so that the electronic pump is communicated with the low-pressure cooling and lubricating oil circuit, to supply oil to the low-pressure cooling and lubricating oil circuit.

Specifically, since the clutch is finished the engagement in this circumstance, it is considered that the flow output by the mechanical pump can meet the requirements for the main oil pressure of the high-pressure control oil circuit in a stable state. The pilot switch solenoid valve may be energized to control the high-low pressure decoupling valve to be in the decoupled state, so that the electronic pump is communicated with the low-pressure cooling and lubricating oil circuit, and the flow output by the electronic pump directly flows into the low-pressure cooling and lubricating oil circuit through the high-low pressure decoupling valve, to supply oil to the low-pressure cooling and lubricating oil circuit, thereby effectively reducing the load of the electronic pump and greatly improving the working efficiency of the electronic pump.

In this embodiment, the coupled and decoupled states of the high-low pressure decoupling valves are controlled in the hybrid working mode, so that the electronic pump can supply flow to the high-pressure control oil circuit when multiple clutches all work, so as to avoid the problem of oil pressure drop. Supply measures may be taken in time to effectively ensure the stability of the system oil pressure. After the clutch is engaged, the high-low pressure decoupling valve is controlled to be in a decoupled state, and the flow output by the electronic pump directly flows into the low-pressure cooling and lubricating oil circuit through the high-low pressure decoupling valve, thereby effectively reducing the load of the electronic pump and greatly improving the working efficiency of the electronic pump.

Figure 8:
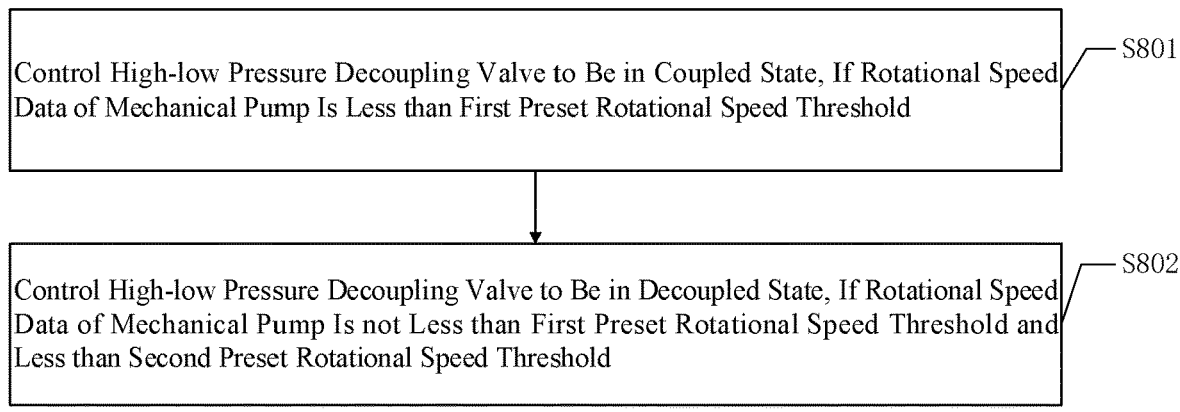
FIG. 8 is a specific flowchart of step S503 in FIG. 5.

In one embodiment, the hydraulic state data is rotational speed data of the mechanical pump in the hybrid working mode. As shown in FIG. 8, in step S503, that is, step of dynamically adjusting the working state of the vehicle hydraulic control system according to the hydraulic state data and the preset adjustment strategy includes the following steps.

S801: if the rotational speed data of the mechanical pump is less than a first preset rotational speed threshold, the high-low pressure decoupling valve is controlled to be in the coupled state.

Whether the rotational speed data of the mechanical pump is reasonable may be determined by comparing the rotational speed data of the mechanical pump with a reasonable range, that is how to determine whether the rotational speed data of the mechanical pump is reasonable. A lower limit of the reasonable range is the first preset rotational speed threshold, and an upper limit of the reasonable range is a second preset rotational speed threshold.

Specifically, if the rotational speed data of the mechanical pump is less than the first preset rotational speed threshold, it is considered that the flow output by the mechanical pump is too small to reach the flow required by the high-pressure control oil circuit, resulting in that the main oil pressure decreases or the oil pressure fluctuates. In this circumstance, the high-low pressure decoupling valve may be controlled to be in the coupled state, that is, enters a right position working state, so that the electronic pump is communicated with the high-pressure control oil circuit, and the electronic pump and the mechanical pump are coupled to work. Besides, the flow for the high-pressure control oil circuit is supplied in time, to ensure the stability of the system.

S802: if the rotational speed data of the mechanical pump is not less than the first preset rotational speed threshold and less than the second predetermined rotational speed threshold, the high-low pressure decoupling valve is controlled to be in the decoupled state.

Specifically, if the rotational speed data of the mechanical pump is not less than the first preset rotational speed threshold and less than the second preset rotational speed threshold, it is considered that the rotational speed data of the mechanical pump is within the reasonable range in this circumstance. That is, the flow output by the mechanical pump can reach the flow required by the high-pressure control oil circuit. Then, the pilot switch solenoid valve is energized, the high-low pressure decoupling valve may be controlled to be in the decoupled state, so that the electronic pump is communicated with the low-pressure cooling and lubricating oil circuit, and the electronic pump and the mechanical pump are decoupled to work. In this circumstance, the electronic pump provides a flow for the low-pressure cooling and lubricating oil circuit, and the mechanical pump provides flows for the high-pressure control oil circuit and the low-pressure cooling lubricating oil circuit, thereby reducing the load of the electronic pump and effectively improving the working efficiency of the system.

It should be noted that if the rotational speed of the mechanical pump is too high, that is, the rotational speed data of the mechanical pump is greater than the second preset rotational speed threshold, and the flow is large and exceeds the requirements of the high-pressure control oil circuit and the low-pressure cooling lubricating oil circuit. The main oil pressure in this circumstance can reach an opening pressure of the relief valve, so the redundant flow may be returned to an oil inlet of the mechanical pump through the relief valve, thereby ensuring the stability of the oil pressure of the system.

In this embodiment, by analyzing and determining the rotational speed data of the mechanical pump in real time, the working state of the high-low pressure decoupling valve is controlled in time according to the rotational speed data. Therefore, when the flow of the mechanical pump does not meet the requirements of the high-pressure control oil circuit, the electronic pump is communicated with the high-pressure control oil circuit in real time, to supply the oil pressure to the high-pressure control oil circuit, thereby quickly responding to different oil pressure requirements, and ensuring the stability of the system. Besides, the electronic pump is communicated with the low-pressure cooling and lubricating oil circuit when the rotational speed of the mechanical pump is within the reasonable range, thereby reducing the load of the electronic pump and effectively improving the working efficiency of the system.

Figure 9:
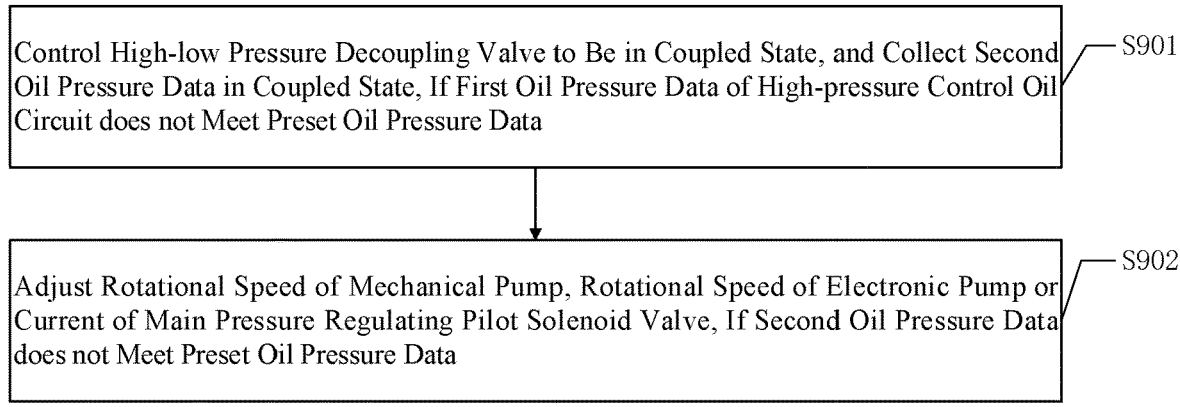
FIG. 9 is a specific flowchart of step S503 in FIG. 5.

In one embodiment, the hydraulic state data includes first oil pressure data of the high-pressure control oil circuit in the hybrid working mode. As shown in FIG. 9, in step S503, that is, step of dynamically adjusting the working state of the vehicle hydraulic control system according to the hydraulic state data and the preset adjustment strategy includes the following steps.

S901: if the first oil pressure data of the high-pressure control oil circuit does not meet the preset oil pressure data, the high-low pressure decoupling valve is controlled to be in the coupled state, and the second oil pressure data in the coupled state is collected.

The first oil pressure data refers to oil pressure data of the high-pressure control oil circuit. The second oil pressure data refers to oil pressure data of the high-pressure control oil circuit when the high-low pressure decoupling valve is in the coupled state. Specifically, if the first oil pressure data of the high-pressure control oil circuit does not meet the preset oil pressure data, it is considered that the oil pressure provided by the mechanical pump is not reach the oil pressure required by the high-pressure control oil circuit, and the high-low pressure decoupling valve is controlled to be in the coupled state. Therefore, the electronic pump is communicated with the high-pressure control oil circuit, to quickly supply the oil pressure required by the high-pressure control oil circuit, thereby ensuring the stability of the oil pressure and the stability of the clutch control.

S902: if the second oil pressure data does not meet the preset oil pressure data, a rotational speed of the mechanical pump, a rotational speed of the electronic pump, or a current of the main pressure regulating pilot solenoid valve is adjusted.

Specifically, after controlling the high-low pressure decoupling valve to be in the coupled state, the second oil pressure data in the coupled state is continued to collect. If the second oil pressure data does not meet the preset oil pressure data, it is considered that the oil pressure required by the high-pressure control oil circuit cannot be met even when the electronic pump and the mechanical pump are coupled to work. Therefore, the oil pressure may be increased by increasing the rotational speed of the mechanical pump, the rotational speed of the electronic pump or the current of the main pressure regulating pilot solenoid valve, thereby ensuring the stability of the oil pressure of the system.

In this embodiment, by analyzing and determining the oil pressure data of the high-pressure control oil circuit in real time, countermeasures are taken in time, thereby ensuring the stability of the oil pressure in real time, and further ensuring the stability of the system operation.

In one embodiment, the hydraulic state data includes oil temperature data for the low pressure cooling lubricating oil circuit. Correspondingly, in step S503, that is, step of dynamically adjusting the working state of the vehicle hydraulic control system according to the hydraulic state data and the preset adjustment strategy includes: if the oil temperature data does not meet the preset oil temperature data, the rotational speed of the electronic pump is adjusted.

The preset oil temperature data is oil temperature data determined according to the requirements for cooling and lubrication of the low-pressure cooling and lubricating oil circuit. Specifically, the vehicle hydraulic control system is provided with a temperature sensor configured to collect oil temperature data of the low-pressure cooling and lubricating oil circuit.

In this embodiment, by analyzing the oil temperature data collected by the temperature sensor in real time, whether the oil temperature meets the requirements of cooling and lubrication is determined. That is, if the oil temperature data does not meet the preset oil temperature data, it is required to increase the rotational speed of the electronic pump, thereby increasing an output flow of the electronic pump, so as to ensure that the oil temperature of the flow in the low-pressure cold lubricating oil circuit always meets the requirements for cooling and lubrication, thereby ensuring the stability of the system.

The above-mentioned embodiments are only used to illustrate the technical solutions of the present application, but not to limit them. Although the present application has been described in detail with reference to the above-mentioned embodiments, those of ordinary skill in the art should understand that: it is still possible to modify the technical solutions recorded in the above-mentioned embodiments, or perform equivalent replacements to some of the technical features, and these modifications or replacements do not make the essence of the corresponding technical solutions deviate from the spirit of the technical solutions in the embodiments of the present application, and shall be included within the protection scope of the present application.

What is claimed is:

1. A vehicle hydraulic control system, connected to a transmission controller, comprising:
a high-pressure control oil circuit comprising:
a main pressure regulating pilot solenoid valve connected to the transmission controller, and configured to adjust a main oil pressure according to an instruction of the transmission controller; and
a main pressure regulating mechanical valve;
a low-pressure cooling and lubricating oil circuit;
a mechanical pump communicated with the high-pressure control oil circuit;
a high-low pressure decoupling valve; and
an electronic pump communicated with the high-pressure control oil circuit or the low-pressure cooling and lubricating oil circuit through the high-low pressure decoupling valve;
wherein the main pressure regulating mechanical valve is configured to guide a flow output by at least one of the electronic pump and/or the mechanical pump communicated with the high-pressure control oil circuit to the low-pressure cooling and lubricating oil circuit according to a control of the main pressure regulating pilot solenoid valve,
wherein when the high-low pressure decoupling valve is in a coupled state, the electronic pump is communicated with the high-pressure control oil circuit, to supply oil to the high-pressure control oil circuit and the low-pressure cooling and lubricating oil circuit, and
wherein when the high-low pressure decoupling valve is in a decoupled state, the electronic pump is communicated with the low-pressure cooling and lubricating oil circuit, to supply oil to the low-pressure cooling and lubricating oil circuit;
wherein the low-pressure cooling and lubricating oil circuit comprises a hydraulic oil cooler, an external pressure filter connected to the hydraulic oil cooler, and a cooling and lubricating reversing valve connected to the external pressure filter;
wherein the hydraulic oil cooler is configured to cool oil flowing into the low-pressure cooling and lubricating oil circuit.

2. The vehicle hydraulic control system of claim 1, wherein the high-pressure control oil circuit comprises a main oil circuit and at least one branch oil circuit communicating with the main oil circuit, wherein the branch oil circuit is connected to an actuator, and the main oil circuit is provided with a main pressure filter, which is configured to filter a flow flowing into the branch oil circuit.

3. The vehicle hydraulic control system of claim 2, wherein the branch oil circuit is provided with a direct-drive solenoid valve and an accumulator, wherein the direct-drive solenoid valve is configured to control the branch oil circuit to engage with the actuator, and the accumulator is configured to maintain a stable oil pressure of the branch oil circuit.

4. The vehicle hydraulic control system of claim 1, wherein the high-pressure control oil circuit further comprises a pilot switch solenoid valve, wherein the pilot switch solenoid valve is connected to the transmission controller and the high-low pressure decoupling valve, and is configured to control a working state of the high-low pressure decoupling valve according to an instruction of the transmission controller.

5. A vehicle hydraulic control method, performed by a transmission controller, comprising:
executing a hydraulic control strategy corresponding to a target working mode in a target working mode, to control a vehicle hydraulic control system to work;
collecting hydraulic state data of the vehicle hydraulic control system; and
dynamically adjusting a working state of the vehicle hydraulic control system according to the hydraulic state data and a preset adjustment strategy;
wherein the executing the hydraulic control strategy corresponding to the target working mode in the target working mode, to control the vehicle hydraulic control system to work comprises:
adjusting a current of a main pressure regulating pilot solenoid valve on a high-pressure control oil circuit, and controlling a cooling and lubricating reversing valve to be in an on state, making a generator connected to the cooling and lubricating reversing value enter a working state, if the target working mode is a hybrid working mode;
adjusting the current of the main pressure regulating pilot solenoid valve, controlling a direct-drive solenoid valve on the high-pressure control oil circuit to engage with a clutch corresponding to the hybrid working mode, making a mechanical pump supply oil to the high-pressure control oil circuit and a low-pressure cooling and lubricating oil circuit; and
controlling a high-low pressure decoupling valve to be in a decoupled state, so that an electronic pump is communicated with the low-pressure cooling and lubricating oil circuit, to supply oil to the low-pressure cooling and lubricating oil circuit;
wherein the hydraulic state data is rotational speed data of the mechanical pump in the hybrid working mode, and
wherein the dynamically adjusting the working state of the vehicle control system according to the hydraulic state data and the preset adjustment strategy comprises:
controlling the high-low pressure decoupling valve to be in a coupled state, if the rotational speed data of the mechanical pump is less than a first present rotational speed threshold; and
controlling the high-low pressure decoupling valve to be in a decoupled state, if the rotational speed data of the mechanical pump is not less than a first preset rotational speed threshold and less than a second preset rotational speed threshold.

6. The vehicle hydraulic control method of claim 5, wherein the executing a hydraulic control strategy corresponding to a target working mode in the target working mode, to control the vehicle hydraulic control system to work comprises:
adjusting a current of a main pressure regulating pilot solenoid valve on a high-pressure control oil circuit, so that a main oil pressure that meets a pure electric working mode is established in a high-pressure control oil circuit, if the target working mode is the pure electric working mode; and
controlling a high-low pressure decoupling valve to be in a coupled state, so that the electronic pump is communicated with the high-pressure control oil circuit to supply oil to the high-pressure control oil circuit and a low-pressure cooling and lubricating oil circuit.

7. The vehicle hydraulic pressure control method of claim 5, wherein the hydraulic state data comprises first oil pressure data of the high-pressure control oil circuit in the hybrid working mode, and the dynamically adjusting the working state of the vehicle hydraulic control system according to the hydraulic state data and the preset adjustment strategy comprises:
controlling the high-low pressure decoupling valve to be in a coupled state, and collecting second oil pressure data in the coupled state, if the first oil pressure data of the high-pressure control oil circuit does not meet a preset oil pressure data; and
adjusting a rotational speed of the mechanical pump, a rotational speed of the electronic pump or a current of the main pressure regulating pilot solenoid valve, if the second oil pressure data does not meet the preset oil pressure data.

8. The vehicle hydraulic control method according to claim 5, wherein the hydraulic state data comprise oil temperature data of a low-pressure cooling and lubricating oil circuit, and the dynamically adjusting the working state of the vehicle hydraulic control system according to the hydraulic state data and the preset adjustment strategy comprises:
adjusting a rotational speed of the electronic pump, if the oil temperature data does not meet the preset oil temperature data.

9. The vehicle hydraulic control system of claim 1, wherein the low-pressure cooling and lubricating oil circuit cools and lubricates an EM1 motor, an EM2 motor and clutch shaft teeth.

10. The vehicle hydraulic control system of claim 9, wherein an oil outlet of the mechanical pump is communicated with one end of the main pressure regulating mechanical valve, and other end of the main pressure regulating mechanical valve is communicated with a low-pressure pilot oil circuit, when the mechanical pump and the EM1 motor enter the working state;

wherein the main pressure regulating mechanical valve adjusts opening degree of a valve core with current change of the main pressure regulating pilot solenoid valve.

11. The vehicle hydraulic control system of claim 9, wherein the electronic pump is communicated with the high-pressure control oil circuit through the high-low pressure decoupling valve, and provides a flow for the low-pressure cooling and lubricating oil circuit through a low-pressure pilot oil circuit, when the mechanical pump and the EM1 motor do not enter the working state.

12. The vehicle hydraulic control system of claim 1, wherein an input shaft of a gearbox is connected to the mechanical pump to provide the mechanical pump with working power.

13. The vehicle hydraulic control system of claim 1, further comprising: a pressure limiting valve provided on a pipeline communicating the electronic pump with the high-low pressure decoupling valve.

14. The vehicle hydraulic control system of claim 1, further comprising: a relief valve connected to the oil inlet of the mechanical pump and a low-pressure pilot oil circuit, wherein when the relief valve is opened, redundant flow flows into an oil inlet of the mechanical pump through the relief valve.

15. The vehicle hydraulic control system of claim 1, further comprising: an oil pump check valve arranged on a pipeline communicating an oil outlet of the mechanical pump with the main pressure regulating mechanical valve.

16. The vehicle hydraulic control system of claim 1, further comprising: at least one orifice to realize distribution of flows of oil circuits through the orifices of different diameters.

17. The vehicle hydraulic control system of claim 1, further comprising: a sensor assembly configured to collect hydraulic state data, wherein the hydraulic state data collected by the sensor assembly are fed back to the transmission controller, so that the transmission controller is capable of adjusting working state of the system according to the hydraulic state data.

* * * * *